Patented Aug. 11, 1953

2,648,635

UNITED STATES PATENT OFFICE 2,648,635

FELTED WATER-SOLUBLE CLEANSING TISSUE

Russell Jacques Brown, John Downing, and Walter Henry Groombridge, Spondon, near Derby, England, assignors to British Celanese Limited, a corporation of Great Britain No Drawing. Application September 9, 1949, Serial No. 114,914. In Great Britain October 7, 1948

1 Claim. (Cl. 252—91)

This invention relates to cleansing materials which have a detergent action and are suitable for personal washing.

The cleansing materials of the invention are sheets or tissues having a basis of a fibre-forming water-soluble substance and containing also a non-fibre-forming surface-active agent.

In the preferred form of the invention the cleansing material comprises a felt or fabric made up of fibres of the fibre-forming water-soluble substance, and the invention will be more particularly described by reference to materials of this kind.

Preferably the fibrous substance is a water-soluble cellulose ether and especially a water-soluble methyl cellulose or methyl ethyl cellulose or a water-soluble carboxymethyl methyl cellulose or carboxymethyl ethyl cellulose such, for example, as are described in U. S. application S. No. 114,912, filed September 9, 1949, corresponding to U. K. application No. 26,175/48, filed October 7, 1948. Water-soluble fibrous substances other than cellulose ethers, e. g. alginate or polyvinyl alcohol fibres, can however be used if desired.

The non-fibre-forming surface-active agent used should be one which does not harm the skin and which is readily absorbed by the fibrous substance and may be anion- or cation-active or non-ionic in nature. Examples of suitable surface-active agents are the higher alkyl sulphates, i. e. sulphates of alcohols containing 6 or more, especially more than 9, carbon atoms in the molecule, sulphonated fatty alcohols, long-chain alkyl trimethylammonium halides and pyridinium halides, sulphonated vegetable oils, and condensation products of ethylene oxide with higher fatty acids and alcohols, sorbitan or the like. If desired the material may contain two or more non-fibre-forming surface-active agents.

Besides the fibrous cellulose ether or other water-soluble fibrous substance and the non-fibre-forming surface-active agent, the cleansing material may with advantage also contain a bonding agent for the fibres which itself is preferably a cellulose ether and especially a water-soluble cellulose ether. Examples of suitable bonding agents are the sodium salt of carboxymethyl cellulose and a hydroxyethyl methyl cellulose soluble in hot water. If desired, the same cellulose ethers in fibrous form may make up part or all of the fibrous component of the material.

The cleansing material may contain also other substances which may either increase its efficiency or improve its appearance, handle or general attractiveness. For example it may contain a light abrasive or filler, e. g. kieselguhr, fuller's earth or powdered pumice, although the last of these is less desirable as its abrasive action tends to be somewhat high. Again, the material may contain an oil, e. g. olive oil, or a soap, e. g. an alkali metal oleate or an ordinary toilet soap, or an amino-alcohol, especially triethanolamine, or other compound having a pronounced lather-forming action. Its appearance may be improved or its general attractiveness increased by incorporating a small proportion of a dye and/or a perfume.

Cellulose ethers for use in felted tissues may be made with advantage by a method that preserves the fibrous structure of the original cellulose; methyl cellulose, for instance, may be made by the action of methyl chloride in the liquid or vapour phase on alkali cellulose, preferably at temperatures up to 30° C. or even higher, under conditions such that the product dissolves readily in water. Advantageously the coagulation temperature of the cellulose ether, i. e. the temperature at which it begins to coagulate and separate from aqueous solution, is high, especially about 75°–85° C. or higher (in a 2% aqueous solution). Before forming the tissue from the cellulose ether it may be found advantageous to break down aggregates and separate the fibres. For example methyl cellulose may be beaten in water at a temperature above that at which it dissolves, and the loosened fibres drained and dried, or it may be subjected to a mechanical opening operation as in a scutching machine.

The felted tissue may, for example, be made by forming methyl cellulose or other water-soluble fibres, a non-fibre-forming surface-active agent or agents and such other ingredients as may be desired in a suitable liquid medium into a slurry which may be spread or cast in a thin layer on a solid surface or preferably on a wire mesh, for instance as in a Fourdrinier paper-making machine. It is of course important that the fibrous substance should not go into solution during the operation; thus when the tissue is to have a basis of methyl cellulose and the slurry is formed with the aid of water, the composition should be kept at a temperature above the dissolving temperature of methyl cellulose so long as substantial quantities of water are present; if, instead of water, an organic liquid such as alcohol is employed in forming the slurry, the use of elevated temperatures is not usually necessary. After the felted layer has been formed, the liquid medium may be drained off or pressed out as much as is practicable, after which the felted tissue may be ovendried, e. g. at a temperature between about 50° and 110° C.

In another embodiment of the invention the fibrous substance may be in the form of a fabric, especially a loosely woven fabric such as a gauze, on which the non-fibre-forming surface active agent or agents may be deposited. Such a fabric may be made directly from water-soluble yarns, e. g. methyl cellulose, polyvinyl alcohol or alginate yarns, or it may be formed from water-insoluble yarns which can be rendered water-soluble by a suitable treatment; thus, for example, a cotton or regenerated cellulose fabric may be converted by etherification in a known manner into a water-soluble methyl cellulose.

In yet another embodiment of the invention there is employed a continuous film of the fibre-forming water-soluble substance containing the non-fibre-forming surface-active agent or agents and other ingredients as desired. For example a film of water-soluble methyl cellulose may be cast from a cold aqueous solution containing a compatible liquid or solid non-fibre-forming surface-active agent and the other desired ingredients, and may be oven-dried. However, we have found that cleansing materials comprising felted tissues of water-soluble fibres, especially water-soluble cellulose ether fibres, are particularly satisfactory and also easy to make, and such materials constitute the preferred embodiment of our invention.

The following examples give representative compositions that may be formed into a felted tissue as described below:

Example 1

| | Parts |
|---|---|
| Methyl cellulose (coagulation temperature 80° C.) | 12 |
| Mixture of higher alkyl sulphates (20% aqueous solution) | 5 |
| Carboxymethyl cellulose (sodium salt) | 2 |
| Kieselguhr | 4 |
| Potassium oleate | 2 |
| Dye and perfume | Traces |

Example 2

| | Parts |
|---|---|
| Methyl cellulose (coagulation temperature 80° C.) | 12 |
| Mixture of higher alkyl sulphates (20% aqueous solution) | 20 |
| Carboxymethyl cellulose (sodium salt) | 2 |
| Olive oil | 1 |
| Kieselguhr | 4 |

Example 3

| | Parts |
|---|---|
| Methyl cellulose (coagulation temperature 80° C.) | 12 |
| Mixture of higher alkyl sulphates (20% aqueous solution) | 20 |
| Triethanolamine | 5 |
| Kieselguhr | 4 |

Example 4

| | Parts |
|---|---|
| Methyl cellulose (coagulation temperature 80° C.) | 12 |
| Mixture of higher alkyl sulphates (20% aqueous solution) | 20 |
| Hydroxyethyl methyl cellulose (soluble in hot water) | 2 |
| Triethanolamine | 5 |
| Kieselguhr | 4 |

Example 5

| | Parts |
|---|---|
| Methyl cellulose (coagulation temperature 80° C.) | 12 |
| Hydroxyethyl methyl cellulose (soluble in hot water) | 2 |
| Mixture of higher alkyl sulphates (20% aqueous solution) | 5 |
| Potassium oleate | 3 |
| Kieselguhr | 4 |
| Dye | Trace |

In each example, a slurry of fibres of the methyl cellulose in 200 parts of warm water (temperatures above 45° C. throughout) containing the other listed ingredients was cast as a thin layer on a wire gauze surface, and the greater part of the water removed by drainage. The remainder of the water was evaporated at a temperature between 55° and 110° C.

All the "parts" given are parts by weight. The amount of the higher alkyl sulphates is expressed in terms of a 20% aqueous solution thereof.

Material having the fibre-forming substance in the form of a fabric or film may have the composition given in any of the above examples, if desired omitting the carboxymethyl cellulose or hydroxyethyl methyl cellulose specified in Examples 1, 2, 4 and 5.

The cleansing materials of the invention provide an efficient soap substitute in a very convenient form for use when travelling and in other circumstances where it is not convenient to carry a cake of soap. They may be cut to any suitable size or shape; for example they may be cut into small sheets or leaves whose thickness and superficial area are such that each sheet contains sufficient material for a single wash. Such sheets may be formed into small packs suitable for carrying in a pocket or handbag.

Having described our invention, what we desire to secure by Letters Patent is:

A cleansing material comprising a felted sheet having a basis of a fibrous water-soluble methyl cellulose and containing also a non-fibre-forming surface active agent comprising a water-soluble higher alkyl sulfate having at least six carbon atoms in the alkyl group, the fibres of the methyl cellulose being bonded together by means of the sodium salt of carboxy-methyl cellulose in non-fibrous form.

RUSSELL JACQUES BROWN.
JOHN DOWNING.
WALTER HENRY GROOMBRIDGE.

References Cited in the file of this patent

UNITED STATES PATENTS

| Number | Name | Date |
|---|---|---|
| 2,163,723 | Whitehead | June 27, 1939 |
| 2,226,075 | Rowe | Dec. 24, 1940 |
| 2,231,927 | Lilienfeld | Feb. 18, 1941 |
| 2,236,545 | Maxwell | Apr. 1, 1941 |
| 2,289,039 | Reichel | July 7, 1942 |
| 2,356,168 | Mabley | Aug. 22, 1944 |
| 2,432,091 | Englund | Dec. 9, 1947 |
| 2,476,331 | Swinehart | July 19, 1949 |

FOREIGN PATENTS

| Number | Country | Date |
|---|---|---|
| 488,291 | Great Britain | July 5, 1938 |
| 570,852 | Great Britain | July 25, 1945 |